US012706957B2

(12) United States Patent
Kovacs et al.

(10) Patent No.: US 12,706,957 B2
(45) Date of Patent: Aug. 11, 2026

(54) SYSTEMS AND METHODS FOR CLOUD DISCOVERY AND ORCHESTRATION

(71) Applicant: Zscaler, Inc., San Jose, CA (US)

(72) Inventors: Zoltan Kovacs, Nashville, TN (US); Nathan Howe, Frankfurt (DE)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 18/814,809

(22) Filed: Aug. 26, 2024

(65) Prior Publication Data

US 2026/0058994 A1 Feb. 26, 2026

(51) Int. Cl.
*H04L 29/06* (2006.01)
*H04L 9/40* (2022.01)

(52) U.S. Cl.
CPC .......... *H04L 63/20* (2013.01); *H04L 63/1433* (2013.01)

(58) Field of Classification Search
CPC ............................ H04L 63/20; H04L 63/1433
See application file for complete search history.

(56) References Cited

U.S. PATENT DOCUMENTS 10,291,479 B1 * 5/2019 Oren .................. G06F 9/45558
11,596,027 B2 2/2023 Howe
11,765,593 B2 9/2023 Howe et al.
11,886,610 B1 * 1/2024 Agrawal ............ G06F 21/6227
11,991,216 B1 * 5/2024 Venkatachari .......... H04L 63/20
12,010,553 B2 6/2024 Howe et al.
2009/0216910 A1 * 8/2009 Duchesneau ........... H04L 41/00 709/250
2011/0213869 A1 * 9/2011 Korsunsky ............. G06F 21/55 709/223
2012/0072985 A1 * 3/2012 Davne ..................... H04L 67/10 709/225
2016/0072676 A1 * 3/2016 Gomadam ............. H04L 67/34 709/221
2016/0072815 A1 * 3/2016 Rieke .................... H04L 63/101 726/3
2016/0261564 A1 * 9/2016 Foxhoven ............... H04L 63/20
2017/0339068 A1 * 11/2017 Harned ................. H04L 41/147
2018/0020016 A1 * 1/2018 Hu ...................... H04L 43/0835
2018/0234459 A1 * 8/2018 Kung .................. H04L 63/0263
2019/0146884 A1 * 5/2019 Gangadharappa .. G06F 11/2094 711/162
2019/0158503 A1 * 5/2019 Bansal ................ H04L 63/0272
2020/0076835 A1 * 3/2020 Ladnai .................... G06F 17/18
2020/0128046 A1 * 4/2020 Schaefer ................ H04L 63/20

(Continued)

FOREIGN PATENT DOCUMENTS

EP 3934170 A1 * 1/2022 ............. H04L 43/20
WO WO-2015149062 A1 * 10/2015 ............. G06F 21/52
WO WO-2023057950 A1 * 4/2023 ............. H04L 43/50

*Primary Examiner* — Sher A Khan

(74) *Attorney, Agent, or Firm* — Baratta Law PLLC; Lawrence A. Baratta, Jr.; Ryan Odessa

(57) ABSTRACT

Systems and methods for cloud discovery and orchestration include retrieving a plurality of out-of-band inputs related to a cloud environment; retrieving a plurality of inline inputs related to the cloud environment; determining one or more correlations between one or more destinations, sources, and networks associated with the cloud environment based on the out-of-band inputs and the inline inputs; and determining one or more relationships between the one or more destinations, sources, and networks based on the correlations.

17 Claims, 11 Drawing Sheets

(56) References Cited

U.S. PATENT DOCUMENTS

2020/0162431 A1* 5/2020 Goldschlag ........... H04L 9/3218
2021/0314338 A1* 10/2021 Howe ................. H04L 63/1408
2021/0360032 A1* 11/2021 Crabtree ................. H04L 63/20
2022/0086178 A1* 3/2022 Jayamohan ......... G06F 9/45558
2022/0245475 A1* 8/2022 Blizzard ............... G06F 3/0482
2022/0255957 A1* 8/2022 Campbell ............. G06F 9/4881
2022/0286428 A1* 9/2022 Howe ............... H04W 28/0925
2022/0286429 A1 9/2022 Howe et al.
2022/0286854 A1* 9/2022 Howe ................... H04W 12/08
2022/0286894 A1 9/2022 Howe et al.
2022/0286912 A1 9/2022 Howe et al.
2022/0408255 A1 12/2022 Howe
2023/0164148 A1* 5/2023 Narayan ............. H04L 63/1441 726/13
2023/0164182 A1* 5/2023 Kothari ............... H04L 63/1416 726/23
2023/0205891 A1* 6/2023 Yellapragada ...... H04L 63/1416 726/25
2023/0208871 A1* 6/2023 Yellapragada ......... G06N 3/045 726/25
2023/0300141 A1* 9/2023 Deng .................... H04L 63/105 726/1
2024/0031455 A1 1/2024 Nadendla et al.
2024/0039954 A1* 2/2024 Shete .................. H04L 63/1425
2024/0098108 A1* 3/2024 Limb .................. H04L 63/1425
2024/0129321 A1 4/2024 Howe et al.
2025/0110838 A1* 4/2025 Dornemann .......... G06F 9/5077

* cited by examiner

SYSTEMS AND METHODS FOR CLOUD DISCOVERY AND ORCHESTRATION

FIELD OF THE DISCLOSURE

The present disclosure generally relates to network and cloud security. More particularly, the present disclosure relates to systems and methods for cloud discovery and orchestration.

BACKGROUND OF THE DISCLOSURE

Cloud discovery and orchestration represent foundational components in modern IT infrastructure management, especially amid the widespread adoption of cloud computing solutions. Cloud discovery entails the systematic identification and cataloging of resources, services, and assets across diverse cloud environments. This process is essential for maintaining visibility and governance over cloud-based assets, enabling organizations to effectively manage their digital footprint and ensure compliance with security and regulatory requirements. On the other hand, cloud orchestration involves the automated coordination and provisioning of cloud resources to support various workloads and applications. By orchestrating the deployment and scaling of resources in response to dynamic demand, cloud orchestration streamlines operations, enhances agility, and optimizes resource utilization. Together, cloud discovery and orchestration empower organizations to harness the full potential of cloud technology, driving efficiency, scalability, and innovation across their IT infrastructure, although, data available to traditional systems does not permit the complete identification and determination of risks and connectivity within an organizations cloud environment. The present disclosure provides advanced systems and methods for determining risk and connectivity based on multiple facets of data available both externally and internally to the cloud environment.

BRIEF SUMMARY OF THE DISCLOSURE

The present disclosure relates to systems and methods for cloud discovery and orchestration. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include retrieving a plurality of out-of-band inputs related to a cloud environment; retrieving a plurality of inline inputs related to the cloud environment; determining one or more correlations between one or more destinations, sources, and networks associated with the cloud environment based on the out-of-band inputs and the inline inputs; and determining one or more relationships between the one or more destinations, sources, and networks based on the correlations.

The process 1100 can further include wherein the plurality of inline inputs are retrieved from one or more cloud-based security solutions. The plurality of out-of-band inputs can be retrieved from AWS Route 53, AWS VPC Flow Logs, Azure DNS Query Logs, Azure VNet Flow Logs, Google Cloud DNS Logs, and Google Cloud Flow Logs. The steps can further include providing one or more graphical representations depicting one or more relationships based on the one or more correlations. A graphical representation of the one or more graphical representations can include a depiction of relationships between one or more networks, one or more risk categories, and one or more destinations. The steps can further include generating a risk score for the virtual networks, workloads, and services based on the one or more correlations. The steps can further include generating connectivity predictions for the cloud environment, the connectivity predictions including recommendations for future connectivity needs of the cloud environment.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for cloud discovery and orchestration. Various embodiments include mechanisms that deterministically observe the current risks, traffic flows, and changes needed to implement a zero trust network architecture that is truly decentralized. Customer datasets ingested by these mechanisms are made available through various methods such as log collection, API calls, etc. Such data is readily available, although in its current form, is not necessarily useful. The engines and orchestration with this proposal are adapted to not only enrich the standalone data and provide the necessary correlations/relationships but also provide unique insights and recommendations using data available from various inline cloud-based security solutions.

§ 1.0 CYBERSECURITY MONITORING AND PROTECTION EXAMPLES

Figure 1A:
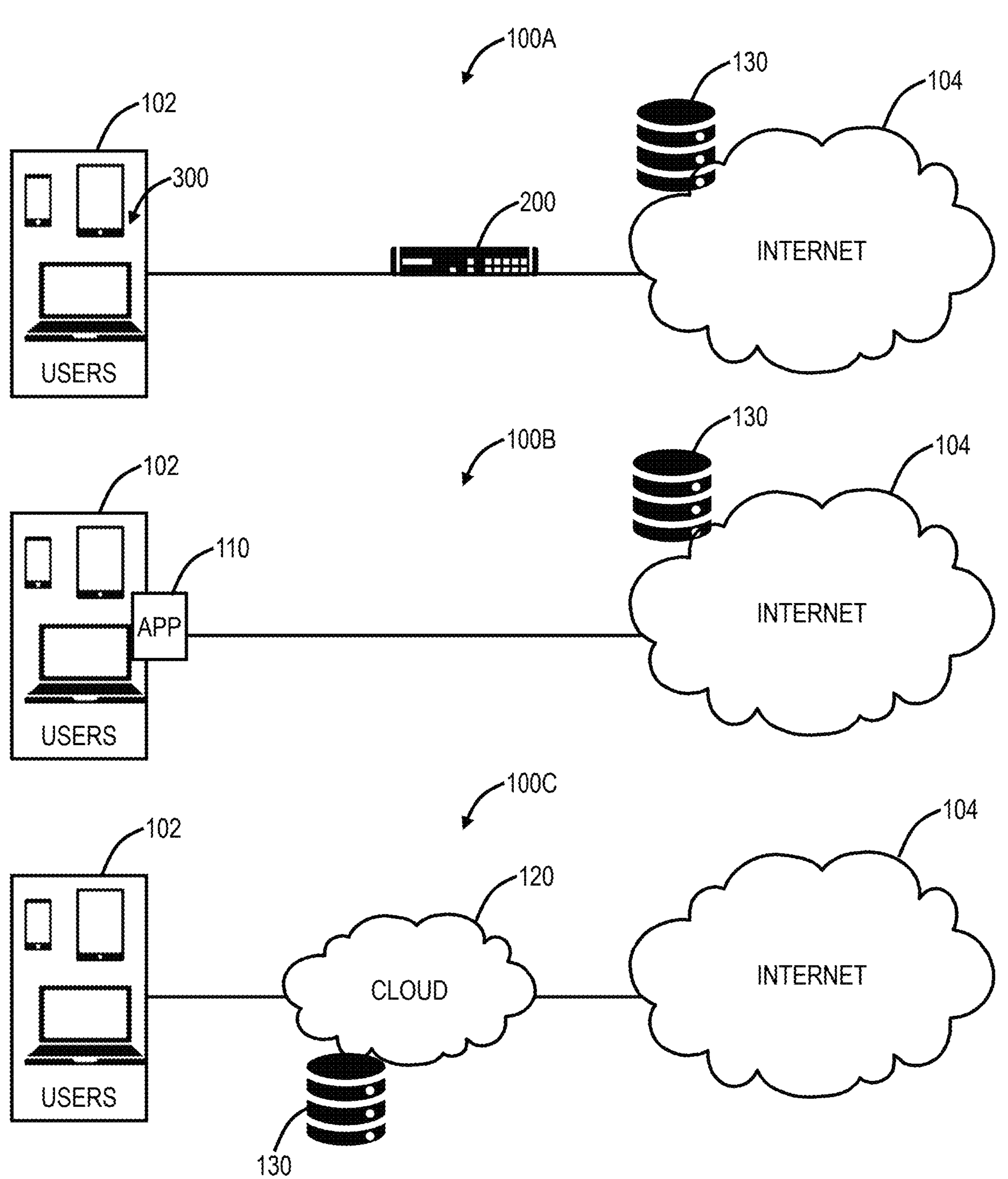
FIG. 1A is a network diagram of three example network configurations of cybersecurity monitoring and protection of a user.
Figure 2:
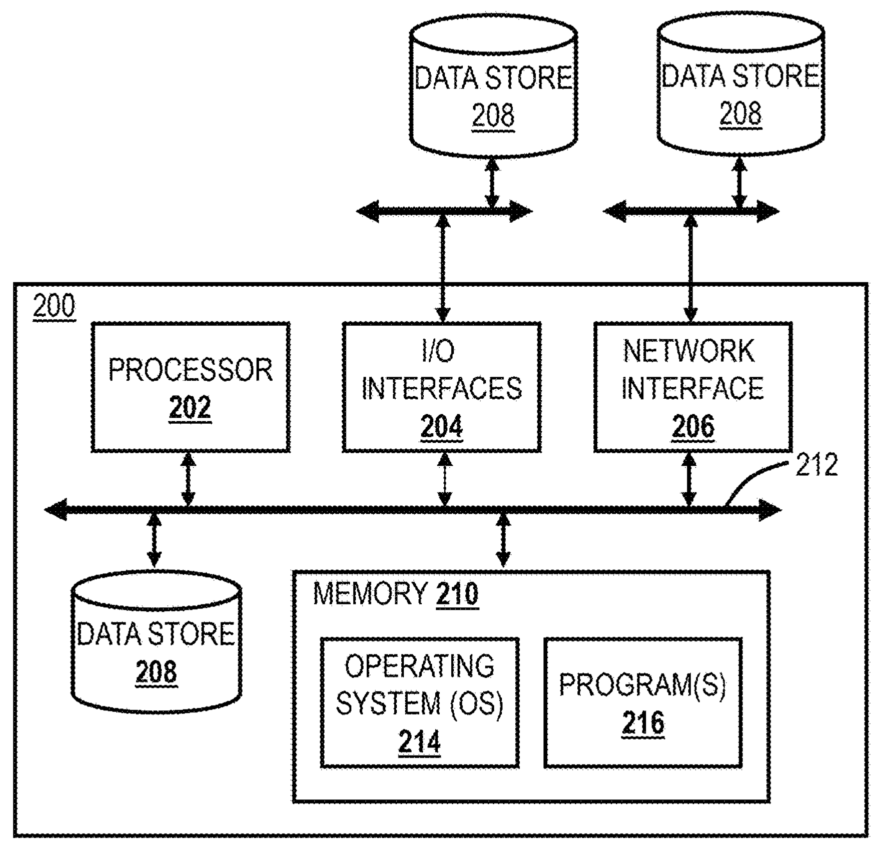
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
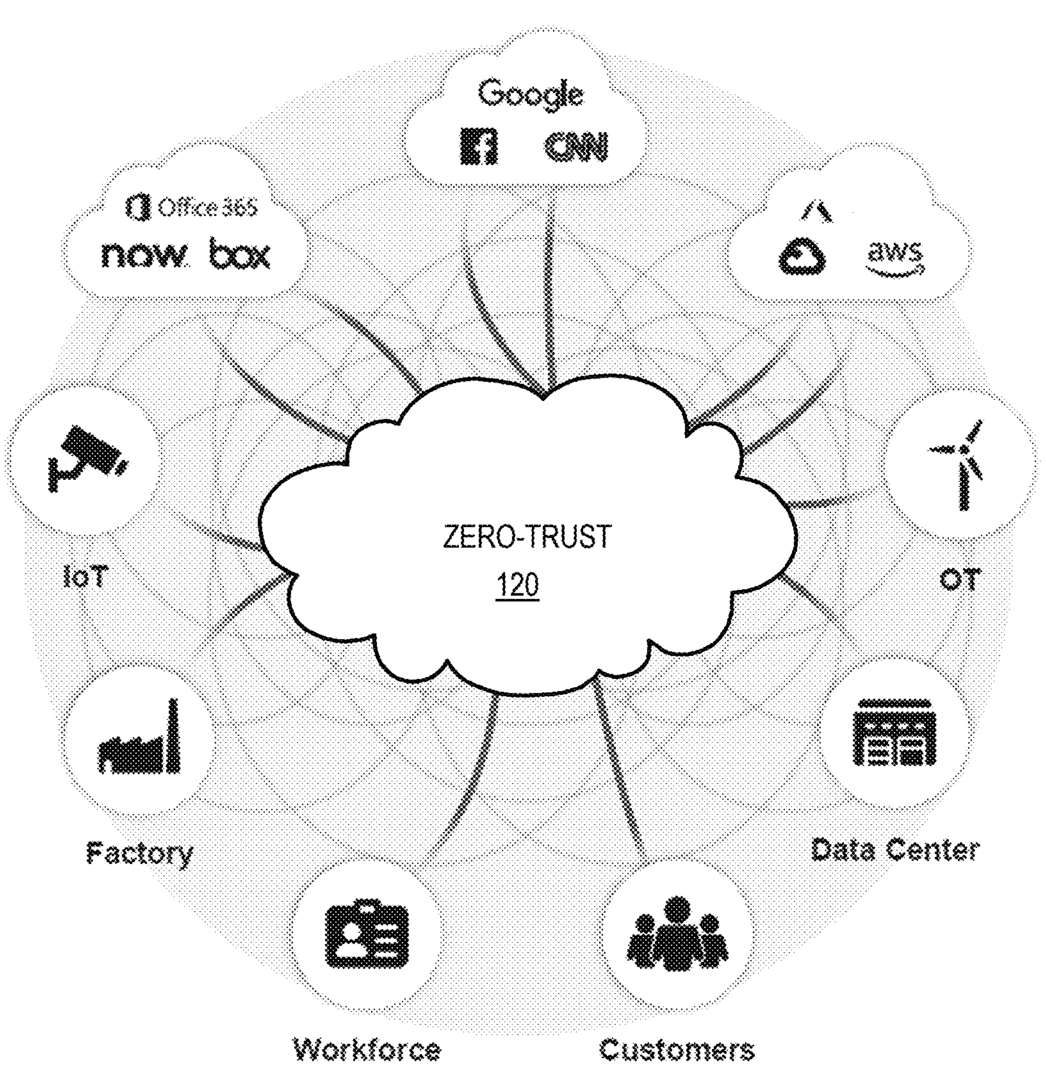
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multifactor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

§ 2.0 EXAMPLE SERVER ARCHITECTURE

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 EXAMPLE COMPUTING DEVICE ARCHITECTURE

Figure 3:
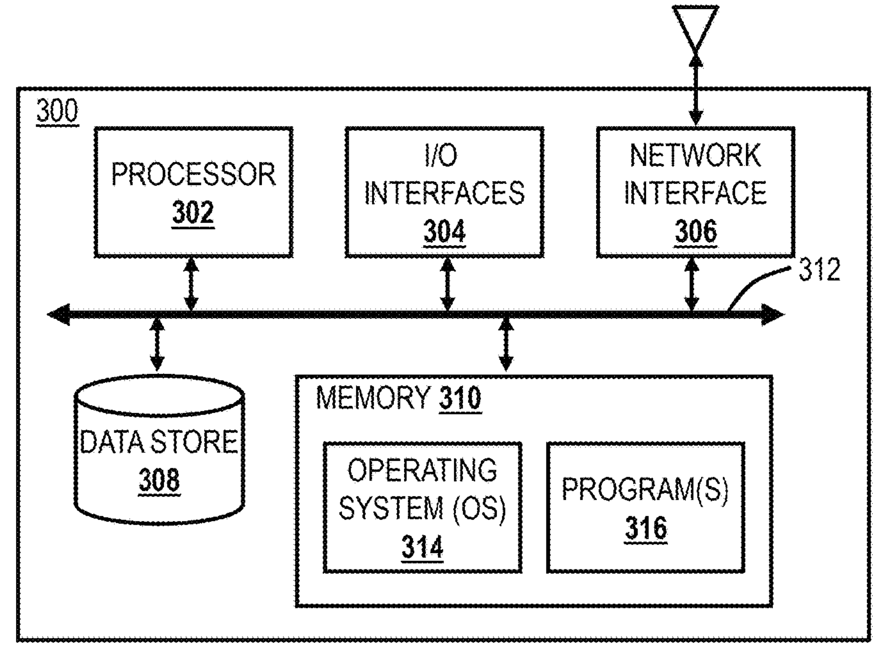
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

$4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
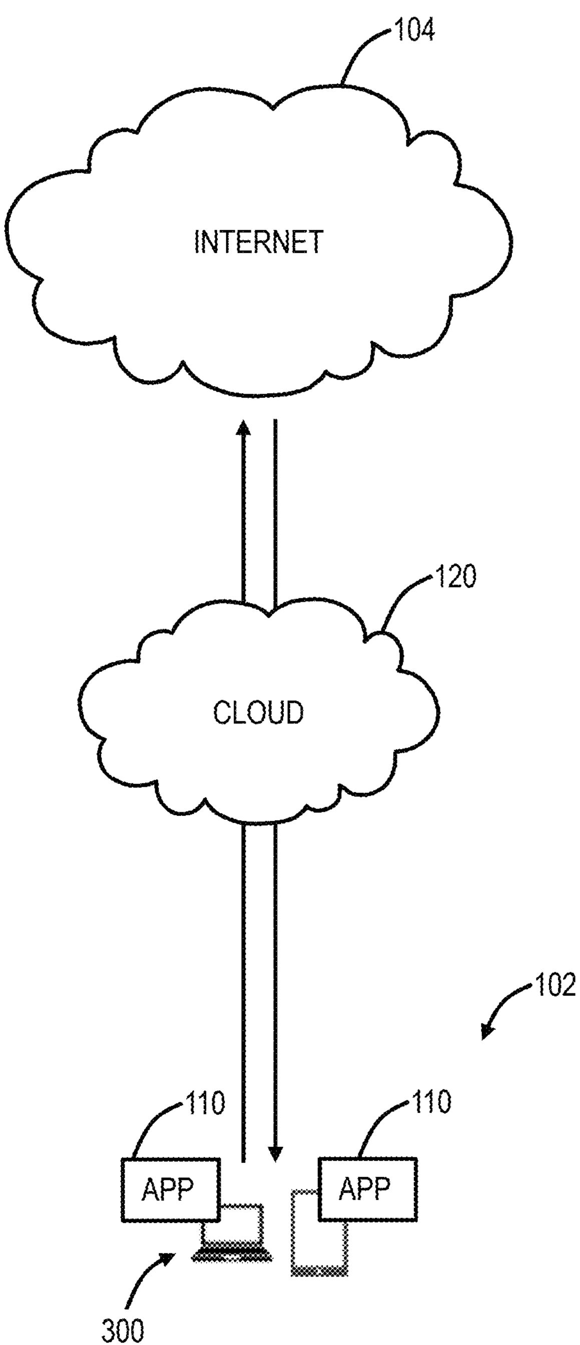
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user 102 setup.

§ 5.0 CLOUD DISCOVERY AND ORCHESTRATION SERVICE

Navigating the intricate landscape of risks and connectivity demands of cloud systems such as the cloud 120 has become a formidable challenge, characterized by its complexity and near-impenetrability without the deployment of sophisticated, distributed inline network security tools such as proxies and firewalls. Even with the advent of cloud posture and configuration assessment tools, which adeptly tackle configuration-related concerns, the aspect of network connectivity often remains inadequately addressed. This shortfall is particularly pronounced in the era of cloud computing, where the proliferation of virtual datacenters brings forth an array of layers and information that transcends conventional network packet boundaries. As a result, the task of comprehensively grasping and managing these multifaceted network dynamics becomes increasingly daunting.

The transition towards distributed cloud, edge, and hybrid computing has empowered organizations worldwide to embrace growth and innovation without the constraints of traditional infrastructure management. Gone are the days when compute resources were confined to servers within the walls of a datacenter. Today, workloads, devices, and even users generate and interact with data, attributes, and network traffic across diverse locations, creating a sprawling and intricate operational landscape. This ubiquity presents significant challenges in terms of security and comprehension of the internal footprint. Organizations grapple with the task of effectively securing these dynamic global environments, particularly in the absence of inline firewalls and proxies, whether virtual, physical, or cloud-based. The absence of such foundational security measures heightens the complexity of safeguarding assets and ensuring compliance within these distributed computing ecosystems.

The present disclosure relates to systems and methods for providing a solution that deterministically observes current risks and traffic flows while providing changes needed to implement a zero trust network architecture that is truly decentralized. The proposed outcomes and solutions leverage the same engines and inputs delineated in this proposal. However, they possess the versatility to operate independently through the utilization of the recommended methods, technologies, and platforms offered by Zscaler. This approach ensures that each solution can function autonomously, drawing upon the robust framework provided by the network configurations 100A, 100B, 100C for seamless integration and deployment. By adhering to the present methodology and leveraging the described suite of technologies and platforms, organizations can harness the full potential of these solutions while enjoying the flexibility to implement them according to their unique requirements and priorities.

The determination of risk should not be limited to present datasets that are available based on customer inputs and risk indicators. The calculation of risk must be dynamic, constantly fed, improved, and leverage Artificial Intelligence (AI) to both determine current risks and find patterns that can indicate future risks. Further, such a system should be adapted to provide recommendations to mitigate such risks. These features are provided by the present systems and methods.

In various embodiments, customer datasets ingested by the present system are available through various means including log collection, API calls, etc. Such data is readily available, but not useful in its current/raw form. The various engines and orchestration described herein are adapted to not only enrich the standalone data and provide necessary correlations/relationships, but also provide unique insights and recommendations using data only available to the cloud 120. The present solutions can be further expanded with partnerships for additional data enrichment, thus expanding the available data to data outside the cloud 120.

In various embodiments, the present systems and methods are adapted to correlate relationships to find access patterns, risks, and predict network flows without being an inline security appliance. Inputs to the present systems can include Domain Name System (DNS) Logs (for example, Amazon Web Service (AWS) Route 53 DNS Query Logs), flow logs (for example, AWS Virtual Private Cloud (VPC) flows logs), infrastructure/environment metadata (for example, AWS VPC metadata), destinations based on DNS and IP, and destination types and risks. The present systems utilize various values from the plurality of inputs to understand connections by also factoring in internal data provided by the various cloud-based security solutions. Again, these solutions include Zscaler Internet Access (ZIA), Zscaler Private Access (ZPA), Zscaler Workload Segmentation (ZWS), Zscaler Digital Experience (ZDX), tag discovery services, and the like. Further, the present systems are adapted to determine risk for a network (VPC or Virtual Network (VNET)) based on the various data source fields. Additionally, in various embodiments, the present systems are adapted to determine the probability of desperate networks needing connectivity/routing.

Figure 5:
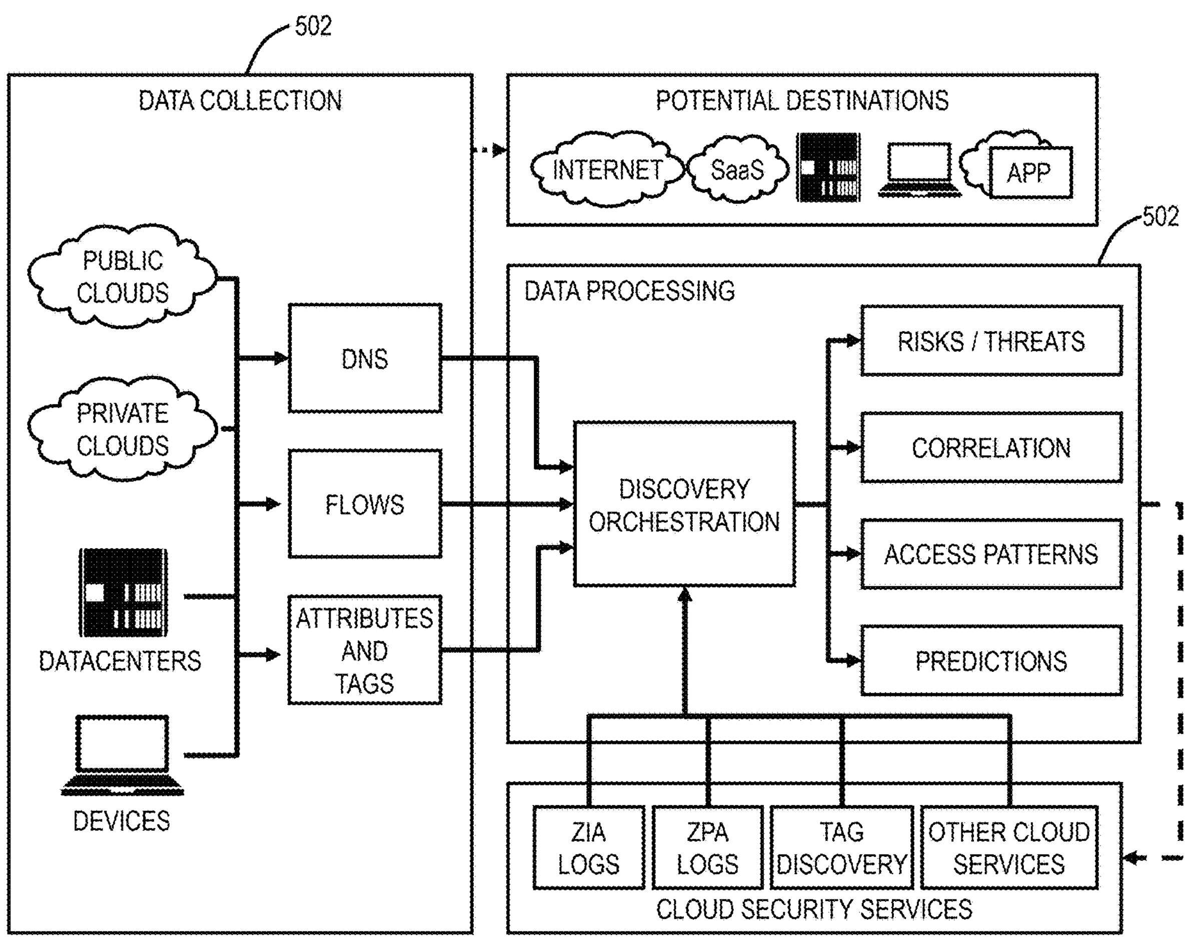
FIG. 5 is a diagram of the cloud discovery and orchestration service.

FIG. 5 is a diagram of the present systems and methods for the cloud discovery and orchestration service. The diagram in FIG. 5 provides an overview of the data flowing into and through the system defined in the present disclosure. The data collection through data storage are described in various sections of the present disclosure, while data enrichment and various functions described below are adapted to specifically connect the dots between various inputs and provide value using correlation, risk, and prediction engines. It will be appreciated that any of the components described herein, such as the various engines, can function as components of the cloud 120 such as a server, a virtual machine, a node, and the like, wherein each of the components are communicatively coupled in order to facilitate their functions and ingest/provide data to/from other components. Referring to the data collection stage 502, the system is adapted to take various inputs such as DNS logs, flow logs, and environment information related to network and application connectivity. In various embodiments, the data input can be associated with a specific tenant of the cloud 120, i.e., a specific customer of the cloud 120 and its various security services. The system is then adapted to perform data cleanup and pre-processing to remove unnecessary fields and normalize fields that refer to same data but may use different field names. This cleaned and pre-processed data is then put into a referenceable format such as JSON. The cleaned and normalized data can then be stored in a graph NoSQL (non-relational) database to query relationships between entities. The system is then adapted to conduct various actions on the data contained in various fields to add additional information not available in the collected data in a data processing stage 504. This additional information can be used, for example, to map a DNS query from out-of-band data to a known threat or URL category known by one of the various cloud-based security services. Again, this additional data (internal/inline data) can be retrieved for the various cloud-based security solutions described herein. The system can then connect the dots between the various inputs to provide a unique view/mapping of the information out-of-band. Further, the system can take the various inputs, compare them to various baselines, take results from threats already collected in addition to potential risks from a networks connectivity perspective to predict risk. The system is adapted to compute the available out-of-band and inline data to reliably identify source and destination locations in a global network across all platforms.

It will be appreciated that in various embodiments the out-of-band data refers to logs collected from the external sources, such as AWS Route 53 DNS Query Logs, without needing to be inline in the network. The inline data refers to inline network security services, such as proxies, firewalls, including but not limited to Zscaler, and the security services offered therefrom.

Figure 6:
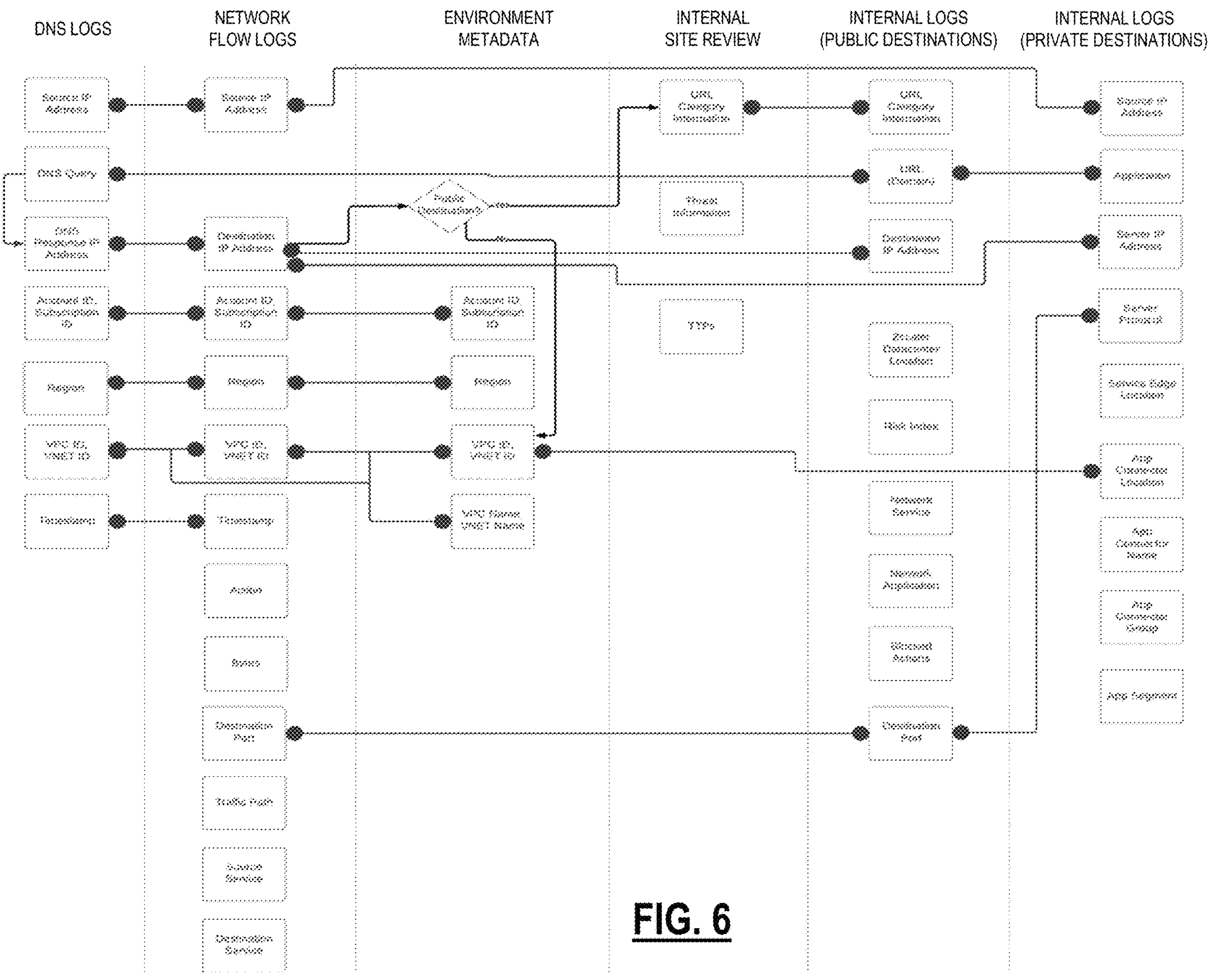
FIG. 6 is a diagram representing various correlations discovered by a correlation engine.

In various embodiments, a correlation engine is contemplated, this correlation engine being a component of the present cloud discovery and orchestration system utilized within the data processing stage 504. It will be appreciated that any of the components described herein can function as a component of the cloud 120 such as a server, a virtual machine, a node, and the like. FIG. 6 is a diagram representing various correlations discovered by the correlation engine. The correlation engine is adapted to bridge the gaps between diverse inputs, which may not encompass all the necessary data points essential for comprehending risk and traffic flows, particularly in instances where it operates independently of an inline security appliance. That is, the correlation engine is adapted to determine relationships between destinations, networks, sources, etc. by combining data inputs from external sources such as AWS Route 53, AWS VPC Flow Logs, Azure DNS Query Logs, Azure VNet Flow Logs, Google Cloud DNS Logs, and Google Cloud Flow Logs and internal sources such as the various security services offered via the cloud 120. This allows the system to synthesize multiple fields from a range of customer inputs, supplemented by various data sources including but not limited to those provided by the described cloud security services offered by Zscaler, to deliver comprehensive analysis. It's pivotal to note that the risk and prediction engines are contingent upon this correlation capability. Without it, the synthesis of critical insights and accurate forecasting would be unattainable. Thus, this invention plays a foundational role in enabling sophisticated risk assessment and predictive capabilities within the operational ecosystem.

Figure 7:
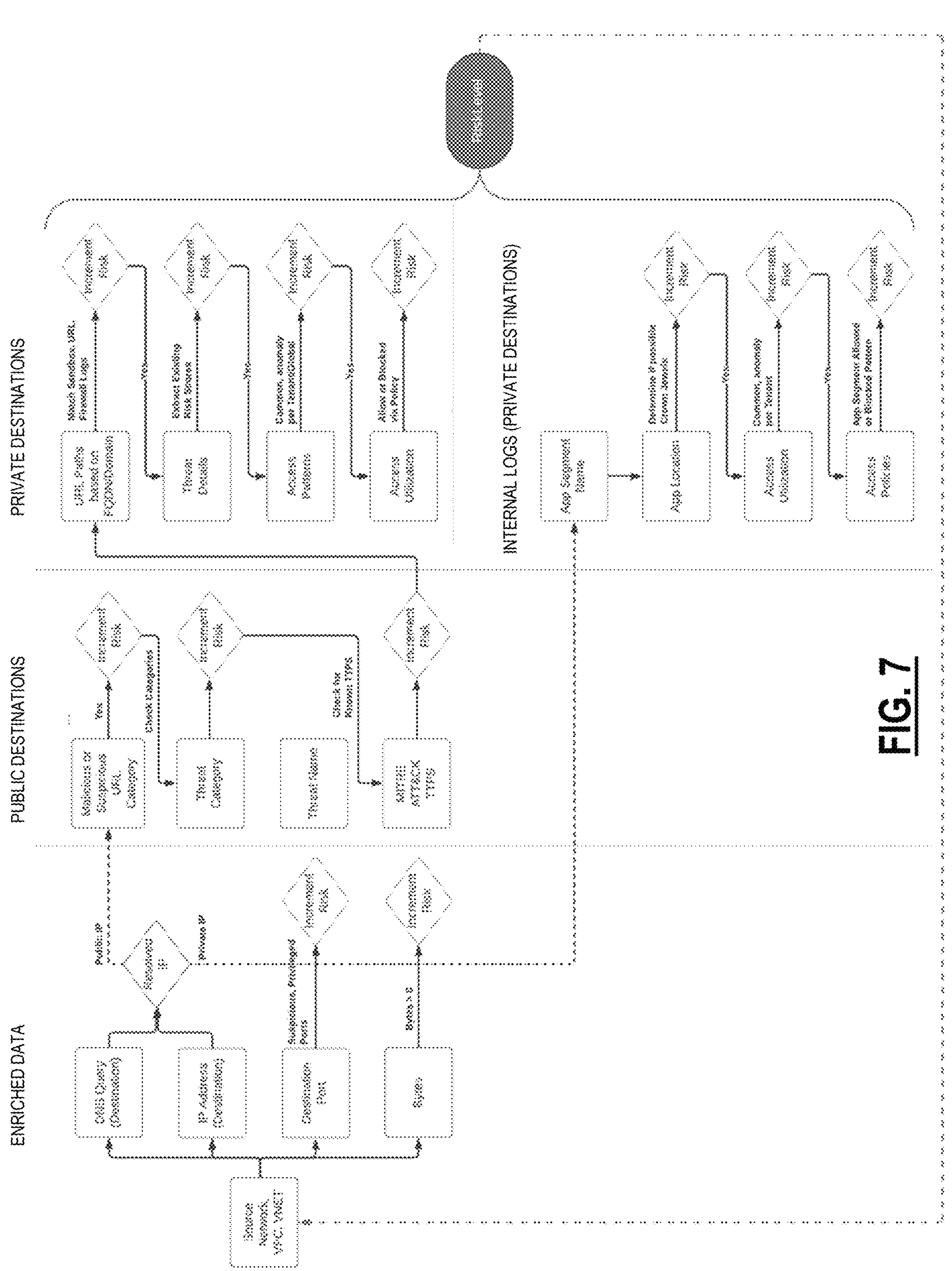
FIG. 7 is a diagram representing the operation of a risk engine.

In various embodiments, a risk engine is adapted to take the correlated, enriched data and based thereon, identify the security risks to the organization (tenant) for both internet (external) and private (internal) access. The risk engine is adapted to increase the risk score based on various factors from the enriched data to determine the overall risk of the source network based on the destinations. Some of the factors that increase risk would be one or more combinations of (1) malicious or suspicious internet destinations accessed by a workload, (2) connectivity to other internal networks, such as a VPC, VNet or Datacenter when no applications in those destinations need to be accessed, and (3) when attributes such as Production vs Test environments or public IP addresses exist for those workloads. Some of the factors to decrease risk would be one or more combinations of (1) only authorized/safe internet destinations accessed by a workload, (2) no internal connectivity to other networks or applications is required, (3) when the workloads have non-production tags, and (4) when the workloads do not have public IP addresses. These risk scores are then fed back into the system for ongoing analysis and changes to the risk vs baselines. FIG. 7 is a diagram representing the operation of the risk engine. As shown, the risk engine ingests the enriched data, i.e., the combination of external and internal data and any relationships determined by the correlation engine, and makes risk related determinations based thereon. Risk levels can be calculated at various levels using this system, specifically around the networks and workloads in those networks. Specific transactions and destinations are inputs for altering the risk of these workloads and networks. For example, the risk level can be incremented based on bytes, destination port, URL categories, threat categories, globally available knowledge bases such as MITRE ATT&CK TTPS, various private destination characteristics such as URL paths, threat details, access patterns, access utilization, and internal logs such as app location, access utilization and access policies. Again, ion reference to FIG. 7 the risk score value can be increased or decreased based on a number of the correlated data points for each source network and individual workloads within the networks. The risk is increased when the destination port is privileged access or common ports for exfiltrating data, such as SSH or RDP, and the total bytes transferred further increases the risk of a potential breach; even though an SSH/RDP destination is risky, combining it with actual data transfer is higher risk. Risk is further increased for workloads/networks where there are connections to public domains that are suspicious or malicious. Known malware/threats associated with such domains further increase the risk. Now, those same source workloads/networks also potentially communicate with private destinations. The risks are increased significantly when the source workload/network has a higher risk score from the public destinations risk calculation when the workloads/network can access many other private resources. However, if a workload/network is isolated and has no private application access within the network it presents less of a risk to the overall enterprise even if that one workload network is high risk. The system can further alter the risk by correlating with existing inline logs not only within the specific enterprise tenant but globally. Out-of-band data does not inspect Layer 7 but gives hints to the destinations. Many malicious destinations will be on unique hostnames/domains, and correlating specific URLs, threats, etc. can be used to determine what type of potential threats exist and how common they are in the ecosystem.

Further, in various embodiments, a connectivity prediction engine is adapted to provide details about the destinations being accessed that are otherwise not available in traditional network packets or in log data 130. By using the correlation engine as a method for obtaining necessary correlated information/data to make predictions, the connectivity prediction engine can help identify physical or virtual locations of destinations and provide all required connectivity in a global multi-network and multi-cloud environment without being an inline security device. Leveraging the correlations established by the correlation engine, the connectivity prediction engine operates to decipher existing connectivity flows, identifying the types of resources in use and their respective locations. By analyzing this data, the connectivity prediction engine generates predictions regarding the actual connections required and their direction. This predictive capability enables organizations to anticipate future connectivity needs accurately, optimizing resource allocation and network efficiency. By forecasting connectivity demands based on real-time data correlations, the engine empowers decision-makers to proactively manage network resources, ensuring seamless operations and minimizing potential disruptions.

Figure 8:
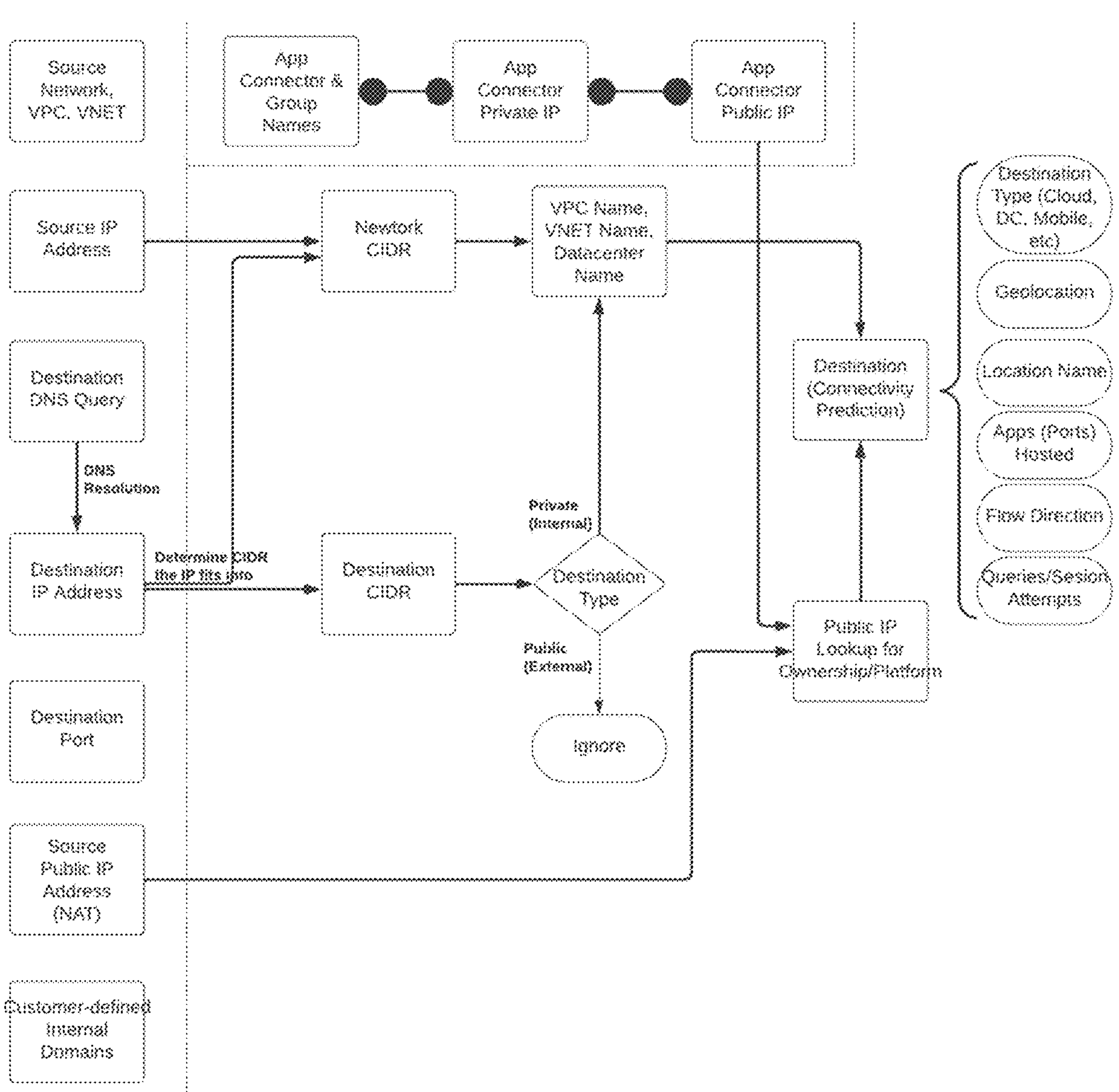
FIG. 8 is a diagram representing the operation of a connectivity prediction engine.

The prediction engine decides what future connections may be needed based on common inputs and destination groupings. Most enterprises have a globally connected network which means there is network connectivity and routing between all sources and destinations. What this invention aims to provide is a blueprint of what application destinations are actually utilized to enable the organizations to decouple the networks in a true Zero Trust Network Architect by treating each workload network as an isolated island. This part of the invention is to solve the problem of wide open access to application segmentation being a massive project in which enterprises simply do not know. The second part of the prediction engine will be to take all of these correlations over time to see common trends. For example, an enterprise deploys a new AWS RDS MySQL Database and starts to provide connectivity to all workloads based on a certain user-defined tag attribute. In this case we can ascertain that all workloads today and tomorrow will need the same access. FIG. 8 is a diagram representing the operation of the connectivity prediction engine, representing the data used by the prediction engine (connectivity prediction engine).

The prediction engine flow is broken into 3 parts: (1) Taking the same out-of-band and in-line data described herein, (2) analyze the access patterns on regular intervals, and (3) take the common attributes and criteria for all the source workloads/networks that go to those destinations. Workloads and servers are more predictable than users when it comes to access patterns which makes it possible to make these predictions. The prediction engine utilizes the initiator's Source Address and its Public IP (NAT) Address to determine the location of the request and checks against Zscaler Data Sources (internal sources), such as Zscaler Private Access (ZPA), to determine if the source is also defined as a destination. If the DNS query for the request resolves to a public IP address or one not owned by the organization in the private networks, the engine will further determine if the destination is public or private. Next, the engine will focus on private destinations and correlate them with the out-of-band and in-line data to determine potential matches based on metadata such as the CIDR range, geolocation. The engine tracks the historical connections attempts to determine the most commonly accessed destinations. If multiple devices attempt to connect to the same private destinations, or if multiple source networks have attempts to connect to the same private destinations, the engine will predict if what, if any, resources will need to access these destinations in the future. For example, if there are 20 networks with at least 1 connection request to a private application in an AWS VPC, and there are only 20 networks discovered total, the engine will predict new networks created will also need to access the same destination. Then if there is a single device in an Azure VNET with "Production" environment tag metadata, two devices in AWS VPCs with "Production" environment tag metadata, and these all have connections to the same destination, the prediction engine will determine the commonality of what resources specifically need to access the destination. These predictions are direction utilized to create access policies based on the correct set of metadata.

Some specifics of the solution such as the storage of the data once cleaned up and pre-processed are not specifically described herein. Although, a graph non-relationship NoSQL type of storage can be optimal in order to enable efficient mapping of relationships between the various entities.

Figure 9:
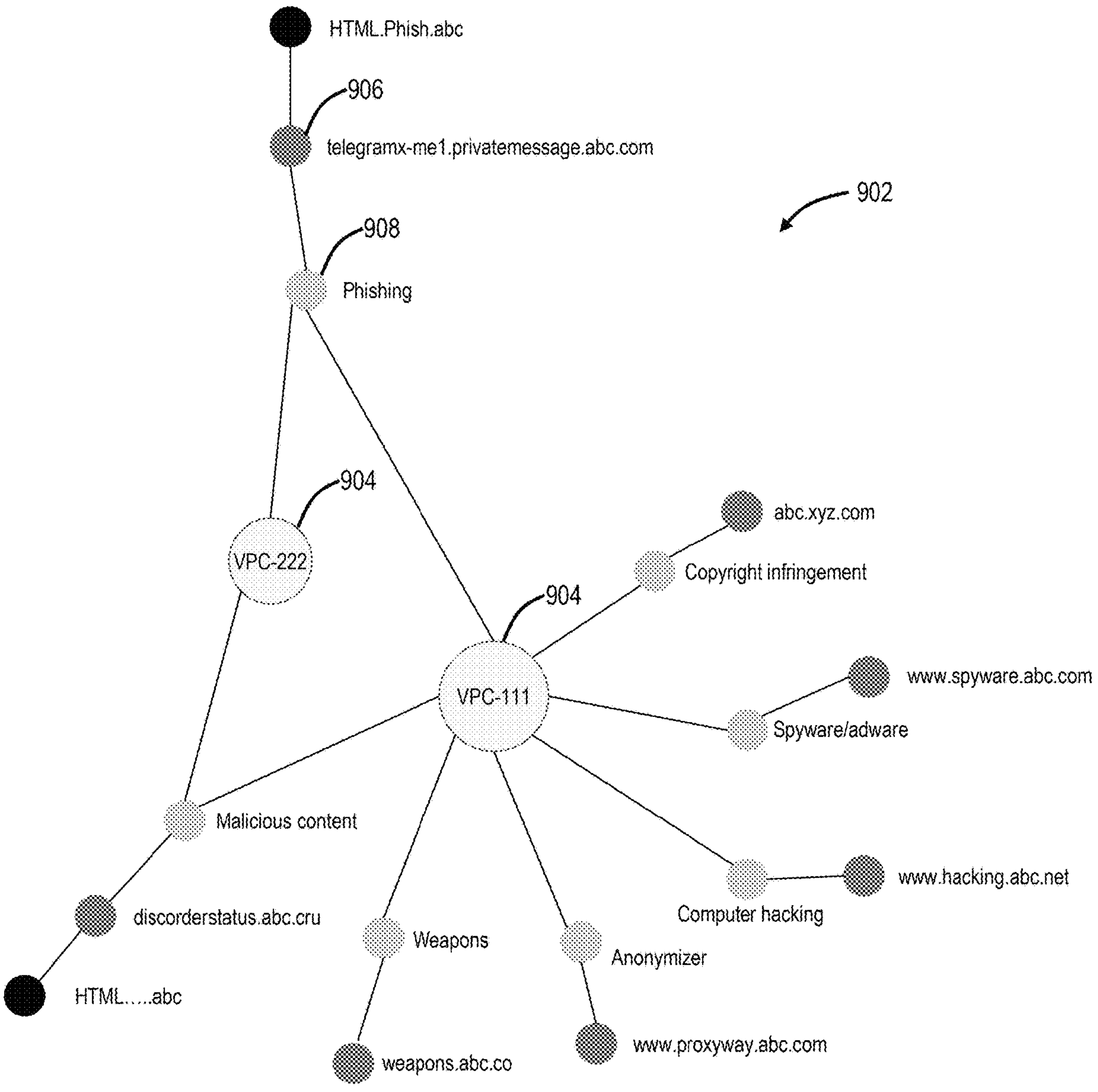
FIG. 9 is an example graphical representation of relationships within a global network.

In various embodiments, the present systems are adapted to produce various graphical representations with relationships depicting the cloud environment. Such relationships can include, for example, AWS VPCs that have potentially risky connections to the internet and other variables that increase the risk of the network. Employing such visualization tools proves invaluable in swiftly identifying the extent of potential risks across multiple environments within a vast global network, thereby facilitating efficient problem prioritization. Through intuitive graphical representations, such as those described herein, stakeholders can gain immediate insights into the distribution and severity of risks across various network environments. This visual depiction enables quick identification of areas with heightened risk levels, allowing organizations to prioritize remediation efforts accordingly. By visually highlighting areas of concern, the visualization tool aids in streamlining decision-making processes, enhancing overall network security posture, and mitigating potential threats effectively. FIG. 9 is an example graphical representation of relationships within a global network/cloud environment. In the example shown in FIG. 9, the visualization includes a risk graph 902 representing a plurality of networks 904, DNS queries 906, threat names 908, and various relationships therebetween. The various graphical representations described herein can be provided by the present systems via computing devices accessible to one or more users. That is, the graphical representations can be displayed on a computing device, allowing administrators to view and interact with the various determinations made by the present system. These visualizations can provide (1) Network-based risk assessment and traffic patterns for a given cloud network to provide/recommend the policies needed, (2) see if there are any, and what type, of threats for workloads in cloud networks, (3) identify the highest risk networks to prioritize remediation steps, (4) generate Zscaler Internet Access (ZIA) policies in a visual manner, (5) discover/show what, if any, private application is required between and from cloud networks, and (6) generate Zscaler Private Access (ZPA) policies in a visual manner. The nodes and edges represented in the visualizations shall be flexible in nature to allow administrators to pivot using any of the discover out-of-band and in-line data along with the found correlations and predictions. These visualizations can be utilized for understanding connectivity requirements, risks, access patterns, and for access policies. The ability to drill into risks in a table or report shall be utilized when a graph visualization no longer becomes usable, such as thousands of nodes and edges in one visualization.

Figure 10:
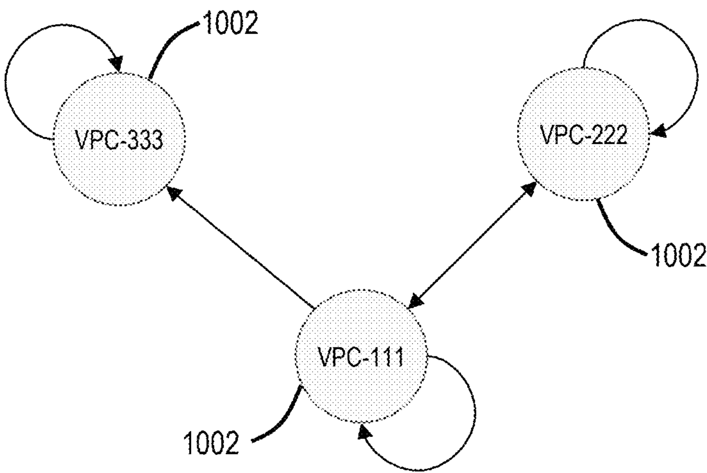
FIG. 10 is an example graphical representation of relationships of relationships between networks.

The systems and methods described herein are adapted to ingest data from various sources, including internal cloud security service sources, to provide a combined view of application and environment connectivity. The various graphical representations can show current connectivity paths between unique networks and can identify connections that are no longer required to migrate to a more zero trust network architecture. The system is able to determine network connections are no longer needed when there are no request attempts from the out-of-band data collected from the source to the destination. Workloads are dynamic from an infrastructure lifecycle perspective but have deterministic and static private destinations needing to be accessed in most cases. That is, for example, if the correlated data shows 20 AWS VPCs that are currently connected to the same network (hub-spoke topology) but only 3 VPCs ever have cross-VPC connectivity requirements, the system will clearly indicate a connection is not needed, thus reducing the lateral threat movement risk. FIG. 10 shows another graphical representation provided by the present systems and methods. The graphical representation shown in FIG. 10 details a plurality of networks 1002, each belonging to a same tenant of the cloud 120. Each of these networks 1002 have application connectivity to each other, as depicted by lines connecting each of the networks. These connections can be uni-directional or bi-directional, represented by arrows in the graphical representation.

Beyond merely mapping the source and destination of network traffic, this visualization tool encompasses additional attributes crucial for comprehensive risk assessment. These attributes may include details such as cloud account information, geographic regions, and specific physical locations associated with network activities. It is possible to obtain, usually via APIs offered by the cloud providers, information about a workload and its network configurations that are not found in the network packets. For example, an AWS EC2 instance has attributes to identify the type of workload (Windows, Linux, etc), what VPC/subnets it is tied to, what Security Groups are associated with it. Then taking the next layer of attributes at the subnet and VPC level can allow us to determine if the VPC is connected to a Transit Gateway hub, if it routes to the Internet Directly, and if it is feasible for the source workload to get to the destination. By incorporating such granular data points into the visualization, the tool offers a holistic view of network connectivity, enabling stakeholders to discern patterns, trends, and potential vulnerabilities with enhanced clarity. With insights into cloud accounts, regions, and locations, organizations can better understand the geographical distribution of their network traffic and identify potential risk hotspots across diverse environments. This multi-dimensional visualization capability facilitates informed decision-making, empowering organizations to proactively address security concerns and safeguard their global network infrastructure effectively.

By utilizing the present systems and methods, actionable insights can be provided to reduce risk, improve operational efficiency, and enhance visibility into complex environments without the need to deploy an additional inline network security solution. The various correlations and relationships of various inputs that are out-of-band are utilized by various tools described herein for visualizing network landscapes as well as providing action recommendations for optimizing and reducing risk within a tenant's various networks. Not only are the present systems and methods used for determining relationships and mapping current environments and risks but can further be utilized to predict and recommend changes to the environment and orchestrate policy creation based on the out-of-band data points.

§ 5.1 Cloud Discovery and Orchestration Process

Figure 11:
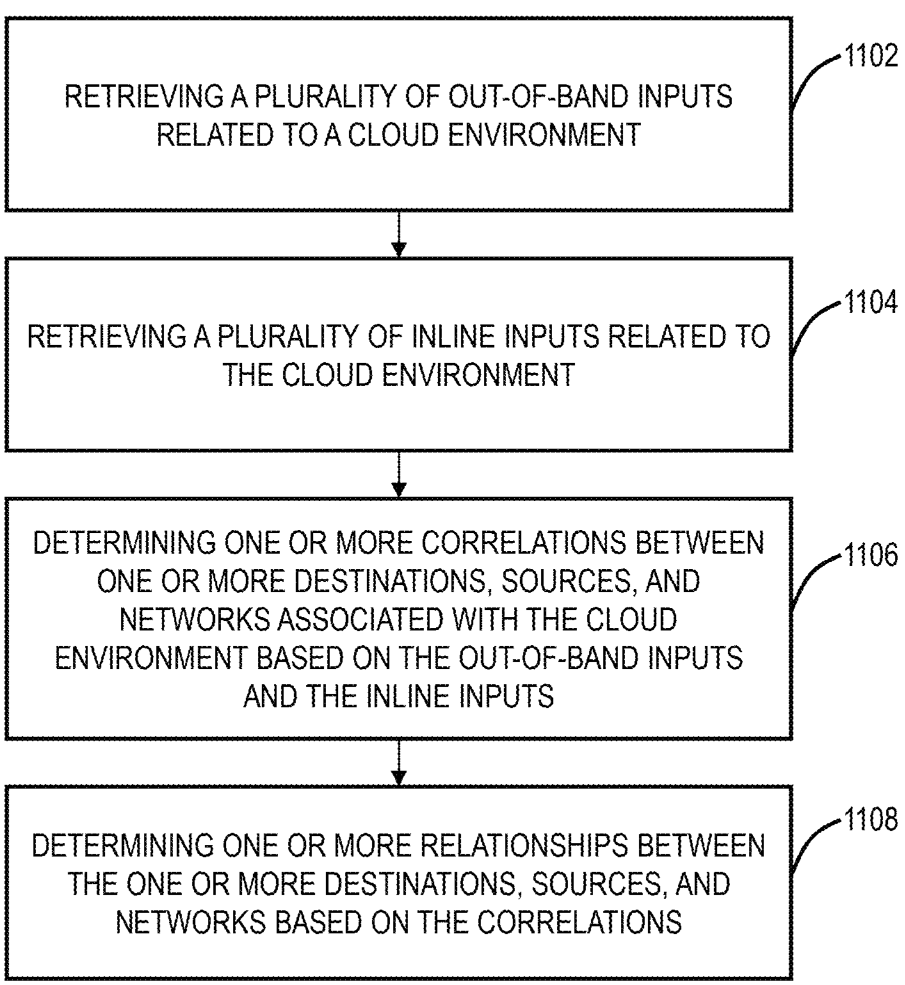
FIG. 11 is a flowchart of a process for cloud discovery and orchestration.

FIG. 11 is a flowchart of a process 1100 for cloud discovery and orchestration. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include retrieving a plurality of out-of-band inputs related to a cloud environment (step 1102); retrieving a plurality of inline inputs related to the cloud environment (step 1104); determining one or more correlations between one or more destinations, sources, and networks associated with the cloud environment based on the out-of-band inputs and the inline inputs (step 1106); and determining one or more relationships between the one or more destinations, sources, and networks based on the correlations (step 1108).

The process 1100 can further include wherein the plurality of inline inputs are retrieved from one or more cloud-based security solutions. The plurality of out-of-band inputs can be retrieved from AWS Route 53, AWS VPC Flow Logs, Azure DNS Query Logs, Azure VNet Flow Logs, Google Cloud DNS Logs, and Google Cloud Flow Logs. The steps can further include providing one or more graphical representations depicting one or more relationships based on the one or more correlations. A graphical representation of the one or more graphical representations can include a depiction of relationships between one or more networks, one or more risk categories, and one or more destinations. The steps can further include generating a risk score for workloads and networks based on the one or more correlations. The risk score is calculated for the workloads and the workload networks that are initiating connections. There is a direct relationship with a workload to the network it resides in, while the factors described in this invention contributing to the risk include what the workload or other workloads in the same network have attempted to or successfully connected to, and what other workload and networks can potentially be compromised due to a threat or risk in the initiating workload network. The steps can further include generating connectivity predictions for the cloud environment, the connectivity predictions including recommendations for future connectivity needs of the cloud environment.

§ 6.0 CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A method comprising:

retrieving a plurality of out-of-band inputs related to a cloud environment from one or more external log sources without being inline in the cloud environment;

retrieving a plurality of inline inputs related to the cloud environment from one or more inline network security services;

determining one or more correlations between one or more destinations, sources, and networks associated with the cloud environment based on the out-of-band inputs and the inline inputs, wherein the correlations bridge gaps between the out-of-band inputs and the inline inputs by mapping the out-of-band inputs to threat information or uniform resource locator (URL) category information available from the inline inputs;

determining one or more relationships between the one or more destinations, sources, and networks based on the correlations; and generating connectivity predictions for the cloud environment, the connectivity predictions including recommendations for future connectivity needs of the cloud environment, wherein the connectivity predictions identify actual connections required and their direction and are based on analyzing access patterns over time using common destination groupings and metadata attributes of source workloads or networks.

2. The method of claim 1, wherein the plurality of inline inputs are retrieved from one or more cloud-based security solutions.

3. The method of claim 1, wherein the plurality of out-of-band inputs are retrieved from any of AWS Route 53, AWS VPC Flow Logs, Azure DNS Query Logs, Azure VNet Flow Logs, Google Cloud DNS Logs, and Google Cloud Flow Logs.

4. The method of claim 1, wherein the steps further comprise:

providing one or more graphical representations depicting one or more relationships based on the one or more correlations.

5. The method of claim 2, wherein a graphical representation of the one or more graphical representations includes a depiction of relationships between one or more networks, one or more risk categories, and one or more destinations.

6. The method of claim 1, wherein the steps further comprise:

generating a risk score for any of workloads and networks based on the one or more correlations.

7. A non-transitory computer-readable medium comprising instructions that, when executed, cause one or more processors to perform steps of:

retrieving a plurality of out-of-band inputs related to a cloud environment from one or more external log sources without being inline in the cloud environment;

retrieving a plurality of inline inputs related to the cloud environment from one or more inline network security services;

determining one or more correlations between one or more destinations, sources, and networks associated with the cloud environment based on the out-of-band inputs and the inline inputs, wherein the correlations bridge gaps between the out-of-band inputs and the inline inputs by mapping the out-of-band inputs to threat information or uniform resource locator (URL) category information available from the inline inputs;

determining one or more relationships between the one or more destinations, sources, and networks based on the correlations; and generating connectivity predictions for the cloud environment, the connectivity predictions including recommendations for future connectivity needs of the cloud environment, wherein the connectivity predictions identify actual connections required and their direction and are based on analyzing access patterns over time using common destination groupings and metadata attributes of source workloads or networks.

8. The non-transitory computer-readable medium of claim 7, wherein the plurality of inline inputs are retrieved from one or more cloud-based security solutions.

9. The non-transitory computer-readable medium of claim 7, wherein the plurality of out-of-band inputs are retrieved from any of AWS Route 53, AWS VPC Flow Logs, Azure DNS Query Logs, Azure VNet Flow Logs, Google Cloud DNS Logs, and Google Cloud Flow Logs.

10. The non-transitory computer-readable medium of claim 7, wherein the steps further comprise:

providing one or more graphical representations depicting one or more relationships based on the one or more correlations.

11. The non-transitory computer-readable medium of claim 10, wherein a graphical representation of the one or more graphical representations includes a depiction of relationships between one or more networks, one or more risk categories, and one or more destinations.

12. The non-transitory computer-readable medium of claim 7, wherein the steps further comprise:

generating a risk score for any of workloads and networks based on the one or more correlations.

13. A server comprising:

a processor; and memory configured to store executable instructions that, when executed, cause the processor to;

retrieve a plurality of out-of-band inputs related to a cloud environment from one or more external log sources without being inline in the cloud environment;

retrieve a plurality of inline inputs related to the cloud environment from one or more inline network security services;

determine one or more correlations between one or more destinations, sources, and networks associated with the cloud environment based on the out-of-band inputs and the inline inputs, wherein the correlations bridge gaps between the out-of-band inputs and the inline inputs by mapping the out-of-band inputs to threat information or uniform resource locator (URL) category information available from the inline inputs;

determine one or more relationships between the one or more destinations, sources, and networks based on the correlations; and generate connectivity predictions for the cloud environment, the connectivity predictions including recommendations for future connectivity needs of the cloud environment, wherein the connectivity predictions identify actual connections required and their direction and are based on analyzing access patterns over time using common destination groupings and metadata attributes of source workloads or networks.

14. The server of claim 13, wherein the plurality of inline inputs are retrieved from one or more cloud-based security solutions.

15. The server of claim 13, wherein the executable instructions that, when executed, further cause the processor to:

provide one or more graphical representations depicting one or more relationships based on the one or more correlations.

16. The server of claim 15, wherein a graphical representation of the one or more graphical representations includes a depiction of relationships between one or more networks, one or more risk categories, and one or more destinations.

17. The server of claim 13, wherein the executable instructions that, when executed, further cause the processor to:

generate a risk score for any of workloads and networks based on the one or more correlations.

* * * * *